(No Model.) 3 Sheets—Sheet 1.
G. T. GLOVER.
VEHICLE SPRING.
No. 481,695. Patented Aug. 30, 1892.
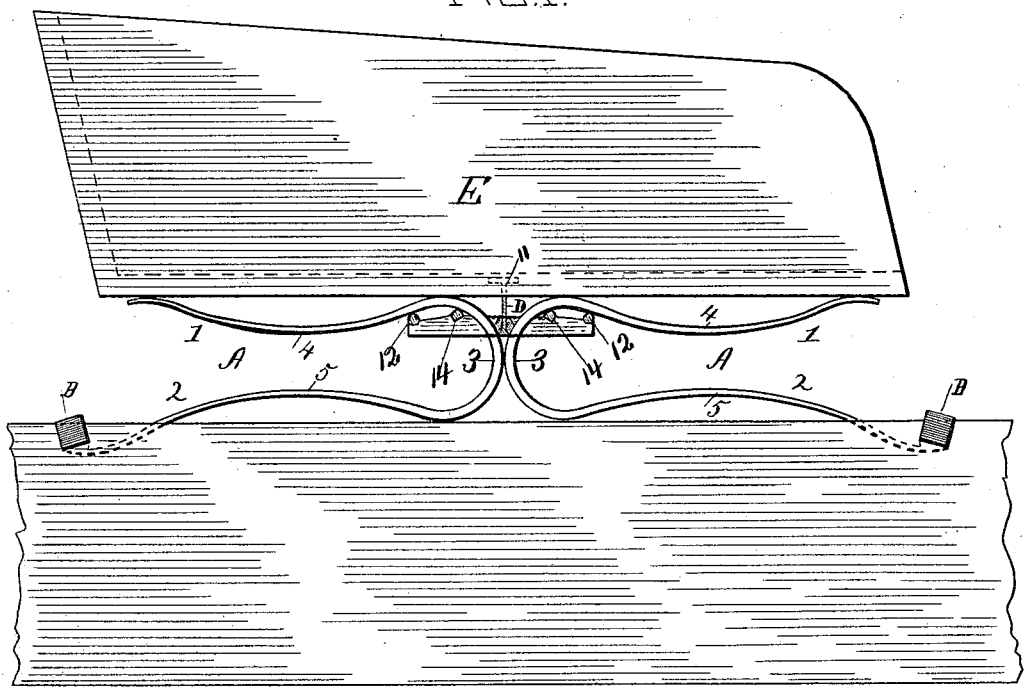
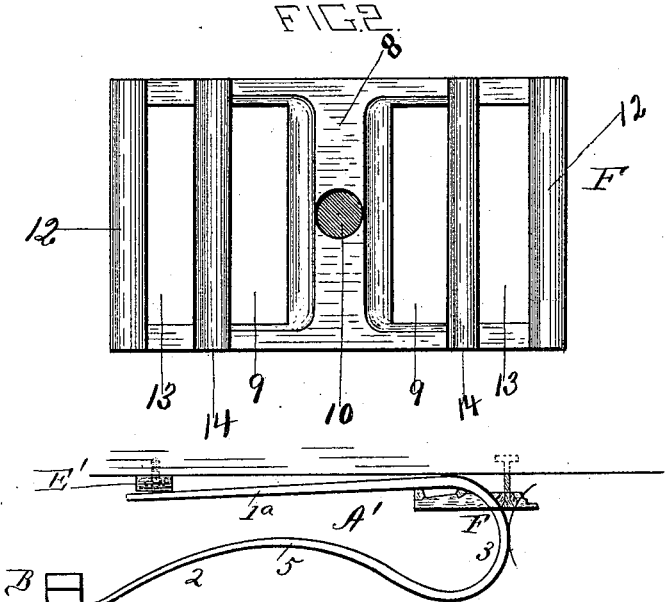
Witnesses
W. Middleton
Margaret M. Wagner
Inventor
George T. Glover
By Chas. G. Page
Atty
THE NORRIS PETERS CO., PHOTO-LITHO., WASHINGTON, D. C.

(No Model.)  3 Sheets—Sheet 2.
G. T. GLOVER.
VEHICLE SPRING.
No. 481,695.  Patented Aug. 30, 1892.
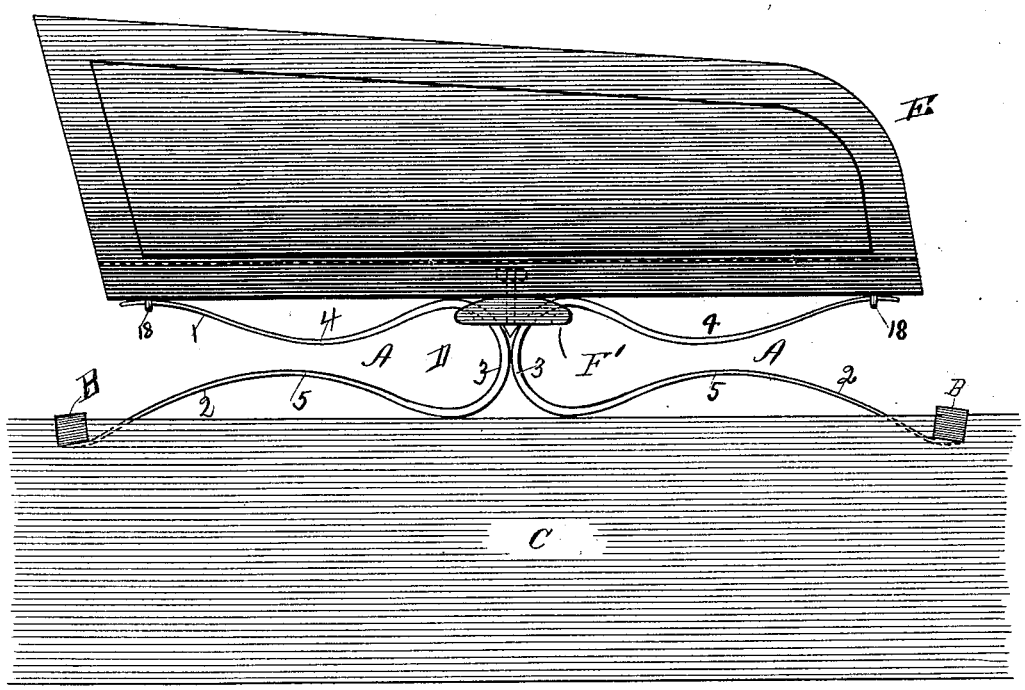
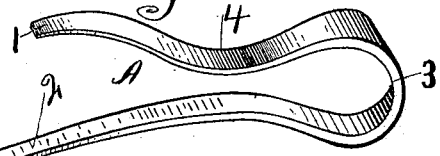
Witnesses,
Inventor,
George T. Glover
Chas. G. Page
Atty.

(No Model.) 3 Sheets—Sheet 3.

G. T. GLOVER.
VEHICLE SPRING.

No. 481,695. Patented Aug. 30, 1892.

Witnesses,
J. F. Mann,
Margaret M. Wagner.

Inventor,
George T. Glover
Chas. G. Page
By, Attys.

THE NORRIS PETERS CO., PHOTO-LITHO., WASHINGTON, D. C.

UNITED STATES PATENT OFFICE.

GEORGE T. GLOVER, OF CHICAGO, ILLINOIS.

VEHICLE-SPRING.

SPECIFICATION forming part of Letters Patent No. 481,695, dated August 30, 1892.

Application filed August 25, 1891. Serial No. 403,658. (No model.)

*To all whom it may concern:*

Be it known that I, GEORGE T. GLOVER, a citizen of the United States, residing at Chicago, in the county of Cook and State of Illinois, have invented a certain new and useful Improvement in Springs for Vehicles, of which the following is a specification.

My invention relates more particularly to springs for the seats of wagons and analogous vehicles, although certain features herein involved can be used to advantage in springs for supporting the boxes or bodies of buggies, carriages, wagons, and the like.

The more prominent objects of my invention are to provide simple, economical, and convenient means for applying the springs; to steady the springs and at the same time to permit them to act with great efficiency; to provide a simple, reliable, and efficient connection between a set of springs and the seat of a wagon or like vehicle, and to adapt the springs for ready and convenient connection with and disconnection from the body of a wagon or like vehicle, so that whenever it may be found desirable the seat and its allotted springs can be removed from the wagon and also the seat adjusted farther forward or farther back, as may be desired.

To the attainment of the foregoing and other useful ends my invention consists in matters hereinafter set forth, and illustrated in the accompanying drawings, in which—

Figure 5:
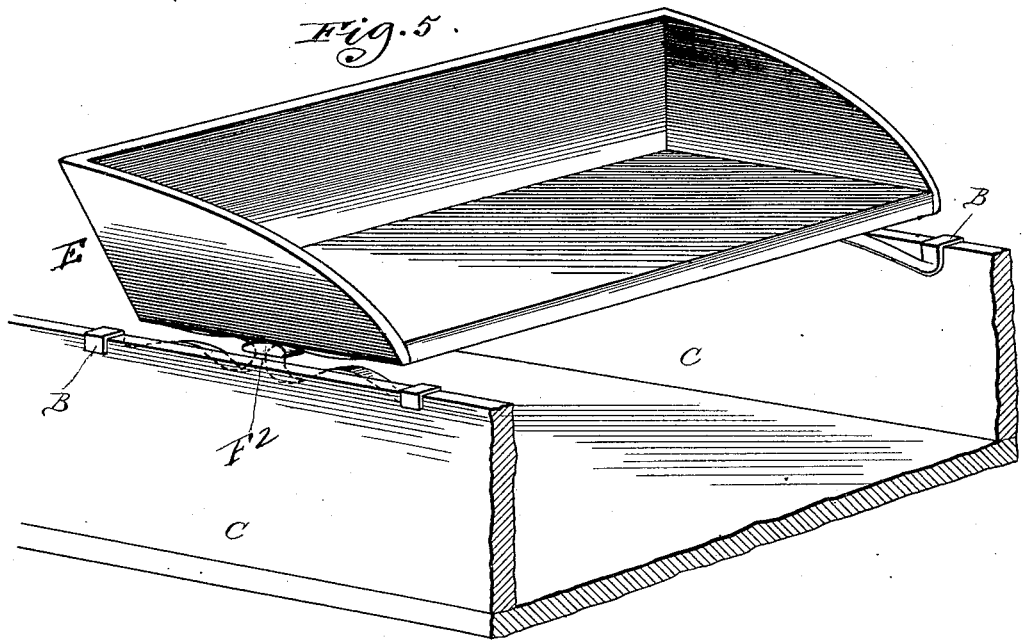
Figure 6:
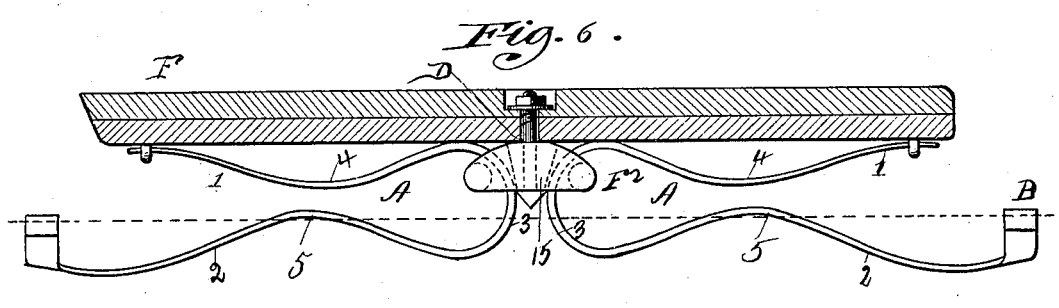
Figure 7:
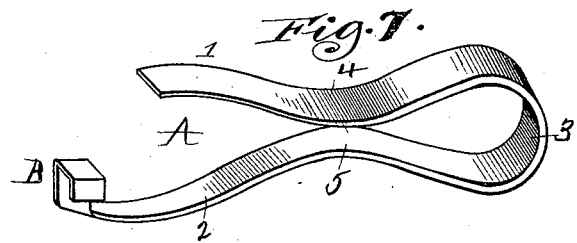
Figure 8:
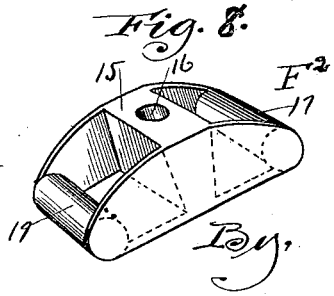

Figure 1 represents in side elevation the forward portion of a wagon-body with a seat supported thereon by springs in accordance with my invention, the keeper which serves to connect a pair of springs with the seat being shown in central longitudinal section. Fig. 2 is a plan view of the keeper constructed as in Fig. 1. Fig. 3 is a view similar to Fig. 1 with a somewhat-modified form of keeper. Fig. 4 represents in perspective the end portion of the lower arm of one of the springs with the hook made separate from the spring and attached to the spring-arm, which at its said end is deflected to one side. Fig. 5 represents in perspective the forward end portion of a wagon-body with the seat supported thereon by springs applied in accordance with my invention, the springs being shown depressed or lower down than in Figs. 1 and 3. Fig. 6 represents a section taken transversely through the seat of Fig. 5, but on a somewhat larger scale, the springs and keeper being shown in elevation. Fig. 7 shows one of the springs in perspective. Fig. 8 shows the keeper of Fig. 6. Fig. 2$^a$ shows the spring with a straight upper arm.

The spring A is bent between its ends so as to provide it with the spring-arms 1 and 2 and a part-circular bend 3 between said arms, and as a preferred construction the arms are bowed toward one another, so as to provide them, respectively, with the curved spring portions 4 and 5, which will come together and cushion under a heavy load.

In order to adapt and utilize springs of such general construction as a means for supporting the seats of wagons and the like, I attach to each end of the seat a pair of springs A, having the ends of their arms 2 adapted for engagement with the sides of the vehicle-body.

As an exceedingly simple and economical construction, the end of each lower arm of the spring, except in Fig. 4, is bent to form a hook B, adapted to fit upon the upper edge portion of the side C of a wagon or other vehicle, by which arrangement these hooks on the ends of the springs can be readily applied to the vehicle-body, and also readily removed therefrom when it is desired to take off the seat.

When the hooks B are applied to engage the upper edge portion of the side C of a wagon-body, as illustrated, the springs will be free to operate in a plane parallel with and alongside such side of the body, as shown in Figs. 5 and 6, it being seen that the ends of the springs are formed with lateral extensions, which are bent to form the hooks, and thereby place said hooks in position to permit the aforesaid action on the part of the springs. The hooks may, however, be made separate from the springs and then either welded or riveted to the same, substantially as in Fig. 4, wherein the end of the lower spring-arm is deflected laterally, as at 6, and the hook B' held against the under side of the lateral extension 6 by a rivet 7.

Each pair of springs is retained in connection with an end of the seat by a keeper or holder which engages the two springs at points along their middle bent portions 3, so as to hold the springs together and permit the seat to rest upon the upper arm of each spring. These keepers are each formed with a central bearing portion for a fastening-bolt D, which passes through a hole in said central bearing portion of the keeper and engages the seat E. The keeper is also formed with a couple of oppositely-arranged openings, through which the curved portions 3 of the springs are arranged to pass.

The keeper F (illustrated in Figs. 1 and 2) is of the form herein preferred, and consists of an oblong casting provided with a central transversely-arranged portion 8, which serves as a bearing for the fastening-bolt D. The keeper is also provided with a couple of slots or openings 9, arranged, respectively, at opposite sides of its middle bearing portion 8, and the springs are arranged to pass through said openings, so that their middle portions 3 shall be held opposite and against one another. By thus arranging the springs with their bent middle portions 3 against one another I secure a compact arrangement, permitting the use of long springs, and attain certain important results in connection with double-armed springs having the outer end portions of their upper arms free to slide against a bearing on the under side of the seat or body. Thus by arranging the springs so as to back one another, I can clip them more loosely to the seat or body, and thereby secure the conjoint action between their middle bends and bent upper arms, and also distribute the spring action more freely. This result I could not attain should I back the middle bends of the springs by correspondingly-curved stationary abutments, as in Patent No. 315,176, since by such arrangement the efficiency of the bent main-spring portions 3 of my springs could be destroyed; but by arranging my springs to abut against one another the bearing portions of such means as I may employ for clipping the springs to the seat or body can be made comparatively narrow, so as not to interfere with the free bending action of the bent middle portions of the springs. With my present arrangement, therefore, the action of the bent middle portions can be freely communicated to the upper spring-arms, and conversely the bending action of the upper spring-arms will be transmitted in part to said middle bends.

The bearing or abutment 8 is provided with a centrally-arranged hole 10 for the bolt D, which is preferably arranged with its head against the under side of the bearing 8, in which case the bolt can extend up through the seat and be held by a nut 11, applied to the upper end of the bolt and countersunk in the bottom portion of the seat, although as a matter of course the bolt can be reversed, so as to countersink its head in the seat and permit the nut to be tightened against the under side of the middle bearing portion 8 of the keeper. The middle bearing portion or abutment 8 of the keeper is also preferably formed so as to allow the bent middle portions 3 of the springs to back against one another, as in Figs. 1 and 3, in which way the springs will hold one another against shift or displacement and also support and strengthen one another at portions where the greatest strain is incurred. The keeper is also preferably extended, as in Figs. 1 and 2, so that its ends 12 will engage the under side of the upper spring-arms at points forward of the middle bends 3 of the springs, in which way the springs will be steadied, and all necessity for the use of clips or the like as a means for holding the ends of their upper arms in connection with the seat be avoided, it being also observed that such arrangement does not interfere with the full and free action of the springs.

For the sake of lightness and economy of metal the end portions of the keeper can be formed with openings 13, so as to provide them with bearing portions 12 and 14, which bear against the inner sides of the springs, although of course the said portions 12 and 14 at each side of the middle bearing portion 8 could be united by a web in place of forming the opening 13 between them.

In Fig. 3 the central bearing portion of the keeper F' is arranged to form an abutment between the opposing middle portions 3 of the springs; but the keeper is made somewhat shorter than the keeper in Figs. 1 and 2, and hence does not admit of its end portions engaging under the upper spring-arms at points as far forward as in Figs. 1 and 2. The keeper shown in Fig. 3, however, permits the springs to back against one another, so as to prevent undue longitudinal displacement of the springs and also practically strengthen them along their curved middle portions 3.

In Figs. 5, 6, and 8 the keeper $F^2$ has its middle bearing portion or abutment 15 arranged so as to back the bent middle portions 3 of the springs, but hold them apart, and in such case the opposite sides of said abutment should be made somewhat higher than the sides of the abutment 8. (Illustrated in certain preceding figures.) The middle bearing portion 15 of keeper $F^2$ is provided with a hole 16 for bolt D, and said keeper is provided between its middle bearing portion 15 and its ends 17 with openings for the bent middle portions 3 of the springs. While therefore I prefer the keeper F of Figs. 1 and 2, it will be seen that the keepers F' and $F^2$ have certain features in common with said keeper F.

By the foregoing described arrangement of springs and keepers I can attach each keeper to the bottom of a vehicle-seat by a single bolt, which can have its head countersunk in the seat-bottom, to which it can have its said head fitted to the lower portion of the double clip and have the nut on its upper end countersunk in said seat-bottom. The outer ends of the upper arms of the springs can be attached to the under side of the seat-bottom by staples or clips, as at 18, in Figs. 3 and 7, which preferably permit the springs at such point to have sliding connections with the seat, so as to allow the bowed portion 4 of the upper spring-arms to straighten out during certain actions on the part of the springs; but with the construction of keeper shown in Figs. 1 and 2 such clips or staples can be dispensed with.

For the broader purposes of my invention the means herein illustrated for attaching the springs in pairs to a vehicle-seat and for applying said springs to the sides of a vehicle-body can be used in connection with various forms of double-armed springs.

I also regard the feature of the keeper as of service in applying the springs in pairs to the under side of the vehicle-body, and in such connection I also consider the feature of permitting the bent middle portions 3 of the springs to abut or back against one another as of service, and hence, while I have herein described these features as matters of special improvement in connection with seat-springs, I also desire to cover the same in connection with body-springs.

It will be observed that each keeper serves to couple the springs in pairs and that the use of one bolt will be ample as a means for attaching each keeper to either the under side of a seat or the under side of a vehicle-body; also, that the combined spring and hook herein illustrated affords an exceedingly simple way of permitting a seat-spring to be applied to the upper edge portion of a vehicle-body.

In Fig. 2ª I have shown a double-armed spring A′, having its lower arm and middle bend formed as hereinbefore described and held by a keeper F, partially illustrated. The upper arm 1ª of the spring A′ is, however, made straight and has its end portion free to slide against a block or bearing E′ on the seat or vehicle-body. When, therefore, the bowed portion of the lower arm and said upper arm cushion, the upper arm will obviously bend, and thus I derive a certain extent of spring action from the upper arm when the two arms cushion, since in such case the upper arm will in yielding bend toward the seat or vehicle-body, according to which of the two it may be attached to. Of course when attached to a vehicle-body the hook B can be omitted and provision be made for a shackle.

By the foregoing last-described arrangement the bearing E′ is so arranged as to leave a space between the seat or body and the normally-straight portion of the spring, which is between said bearing and the middle bend of the spring, and this space allows the normally-straight portion of the spring to bend or bow upwardly when cushioning on the lower arm.

What I claim as my invention is—

1. A pair of double-armed springs formed with bent middle portions 3, which are arranged to abut against and back one another, as set forth, the springs being attached to a seat or body at points above their bent middle abutting portions and having the outer ends of their upper arms free to slide against a bearing on the seat or body, substantially as described.

2. The combination of a pair of double-armed springs, for the purpose set forth, and a keeper engaging and holding together the springs and serving to attach them to a seat or body supported upon them, said springs being arranged with their bent middle portions 3 abutting against one another and the outer ends of their upper arms free to slide against a bearing on the seat or body, substantially as described.

3. The combination of a pair of double-armed springs having curved middle portions 3, a keeper formed with a central transversely-arranged bearing portion for a fastening-bolt and oppositely-arranged openings 9 for the said bent middle portions of the springs, and a bolt D, extending up through the central bearing portion 8, so as to attach the keeper to a seat or body supported upon the springs, substantially as described.

4. A vehicle-seat provided with double-armed supporting-springs arranged in pairs and attached to the seat by keepers which engage the springs adjacent to their middle bends and hold the two springs of each pair with their middle bent portions 3 opposite one another and with the outer end portions of their upper arms, which extend from their middle bends respectively against the front and rear under side portions of the seat, the outer end portions of the lower arms of the springs being provided with hooks for engaging the sides of a vehicle-body, substantially as described.

5. The combination, with a vehicle-seat, of double-armed springs arranged in pairs at opposite ends of the seat and having the outer ends of their lower arms provided with hooks adapted to catch onto the sides of the vehicle-body, keepers connecting the springs in pairs, and bolts for attaching the keepers to the seat, substantially as described.

6. The combination, with a pair of double-armed springs, of a keeper provided with a middle bearing portion 8, openings 9, through which the middle bent portions of the springs extend, and ends which bear against the under side of the upper spring-arms at points forward of said bent middle portions of the springs, substantially as described.

7. A double-armed spring applied for supporting a vehicle seat or body, to which it is attached by a keeper adjacent to its middle bend and formed with a straight upper arm 1ª, which is applied with its outer end portion bearing against but free to slide upon a bearing arranged upon the seat or body, so as to provide between the same and the straight portion of the spring between said bearing and its middle bend a space into which the said normally-straight portion of the spring may bend when cushioning upon the lower arm of the spring, substantially as described.

GEORGE T. GLOVER.

Witnesses:
CHAS. G. PAGE,
M. M. WAGNER.